Aug. 29, 1933.  J. A. BALL  1,924,901
COLOR CINEMATOGRAPHIC APPARATUS
Filed Aug. 15, 1929
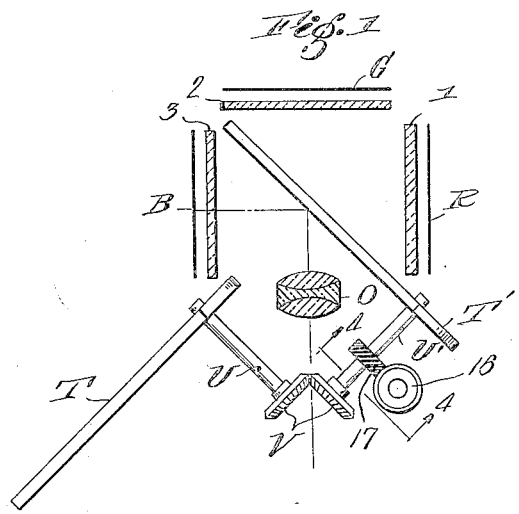
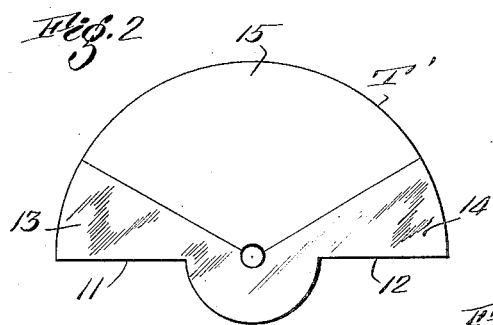
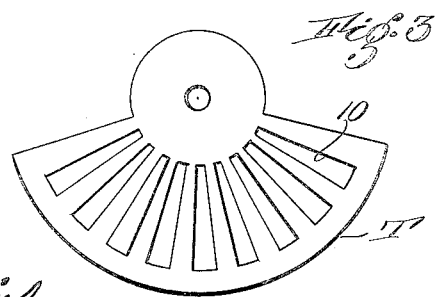
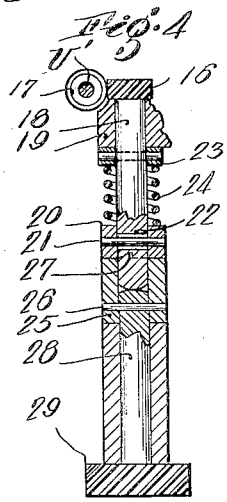
Inventor
Joseph A. Ball
By Roberts, Cushman & Woodbury
his Attorneys Patented Aug. 29, 1933

1,924,901

UNITED STATES PATENT OFFICE 1,924,901

COLOR CINEMATOGRAPHIC APPARATUS

Joseph A. Ball, Los Angeles, Calif., assignor, by mesne assignments, to Technicolor, Inc., New York, N. Y., a corporation of Delaware Application August 15, 1929. Serial No. 386,092

8 Claims. (Cl. 88—19.3)

This invention relates to cinematographic apparatus, and more particularly to cinematographic cameras for concomitantly making plural series of complemental records representing different color aspects of an object-field on the same or different strips of film, preferably through the same lens and therefore from the same point of view, as disclosed for example in my prior application, Serial No. 369,073, filed June 7, 1929.

Objects of the present invention are to provide apparatus in which the inertia of the rapidly moving shutter or shutters produces no damage or jar when the shutter driving means is quickly decelerated or suddenly stopped, as when the apparatus jams due to film dislocation or otherwise, and at the same time automatically to maintain the same angular relationship between the shutter or shutters and the driving means at all times the apparatus is being driven so that the exposure areas of the film are always uncovered at the proper times during normal operation of the apparatus.

For the purpose of illustration a concrete embodiment of the invention is shown in the accompanying drawing, in which Fig. 1 is a diagrammatic view of essential parts of the apparatus.

Figs. 2 and 3 are face views of the two shutters shown in Fig. 1; and

Fig. 4 is a section on line 4—4 of Fig. 1.

In the particular embodiment chosen for the purpose of illustration R, G and B represent three cinematographic films which feed along paths perpendicular to the paper and upon which the red, green and blue records are to be formed respectively, 1, 2 and 3 representing filters for transmitting the desired components of light to the respective films; O represents the objective lens; and T and T' the two shutters above referred to. Each shutter comprises a sector of a disc and is mounted on one of the two shafts U and U' which may be interconnected to be driven in synchronism in any suitable manner, as for example by the bevel gears V. The shutter T is reflecting and is provided with slots 10 to transmit a part of the light to the film G while reflecting a part to the film R. The shutter T' is partially reflecting and partially non-reflecting. The reflecting and non-reflecting portions of the shutter T' may be proportioned and positioned in various ways, as for example by making the portion adjacent one edge 11 reflecting and the portion adjacent the other edge 12 non-reflecting, but as shown in Fig. 2 the reflecting surface is divided into two portions 13 and 14 located adjacent the edges 12 and 14 with the non-reflecting portion 15 intermediate the divided reflecting surfaces.

As shown in Fig. 1, the mechanical interconnection between the two shutters T and T' is such that the two shutters intermesh, that is they cross the light path in succession in intersecting planes, one shutter crossing the light path in the cut-away part of the other shutter while the latter shutter is on the side of its axis opposite the light path. In other words, as the trailing edge of one shutter leaves the light path the leading edge of the other shutter follows closely therebehind. However, the two shutters are preferably timed so as not to touch each other, in which case some light is transmitted between the shutters to the film G, the width of the slots 10 being correlated with the spacing between the shutters so that the total amount of light reaching the film G through all of the spaces will be properly proportioned to the light reflected to film R by the reflecting portion of shutter T and to the light reaching film B from the reflecting portions 13 and 14 of the shutter T'. Obviously, the proportion of light which should reach each of the three films depends upon a number of factors, such as the character of the filters 1, 2 and 3, the character of the films, the judgment of the photographer, etc., the proportions illustrated in the drawing being merely illustrative.

While the two shutters T and T' may be separately driven from the outside, the driving connections are simplified by interconnecting the shutters on the inside, as illustrated in Fig. 1, in which case the plane containing the axes of the two shafts U and U' should of course be offset from the optical axis of the objective O so that the light path is not obstructed by the mechanism for driving the shutters in synchronism. When the shutters are interconnected on the inside the driving means may be connected to either shaft, but as shown in Fig. 1 it is connected to the shaft U' in the form of a spiral gear 16 meshing with a corresponding gear 17 on the shaft U'. As shown in Fig. 4, the gear 16 is fast to a shaft 18 journaled at 19. Slidably mounted on the lower end of the shaft 18 is a clutch element 20, the sliding movement of this element on the shaft 18 being limited by a pin 21 fast therein and sliding in a slot 22 in the shaft. Another collar 23 is pinned to the shaft immediately below the bearing 19 and intermediate the two collars is a compression spring 24 normally holding the collar 20 in its lowermost position with the pin 21 seating in the bottom of the slot 22. Immediately below the element 20 is another clutch element 25 fast, by pin 26, to another shaft 28 in axial alignment with the shaft 18. The clutch element 25 has a single ratchet tooth 27 shaped to fit in a corresponding recess in the element 20 in one angular position of the elements relatively to each other. The shaft 28 is driven by any suitable means, as for example a gear 29.

It will of course be understood that the gear 29 is interconnected with the mechanism for feeding the three films so that each film is advanced while light is obstructed therefrom by one of the shutters T and T'. In the event the driving apparatus is suddenly stopped, as for example due to film jamming, the clutch 20—25 permits the shutters to continue to rotate so that the inertia of these parts produces no shock or damage to the apparatus. During the time the shutters are freely rotated they are maintained in synchronism with each other by the mechanical interconnection therebetween at U. When the apparatus is again put in operation the shutters start in synchronism with the film advancing means owing to the fact that the clutch 25 can pick up the clutch 20 only in one angular position of these parts owing to the fact that the clutch elements have only one interfitting tooth and socket. Thus, the two shutters are maintained in synchronism with each other at all times and in synchronism with the film driving mechanism at all times the apparatus is being driven.

I claim:

1. Cinematographic apparatus comprising a plurality of shutters, means for driving the shutters in synchronism, and over-running clutch means releasing the shutters for continued rotation when the driving means stops abruptly while maintaining the shutters in synchronism.

2. Cinematographic apparatus comprising a plurality of synchronous shutters, means for rotating the shutters which releases the shutters for continued rotation by inertia after the rotating means stops, and means for maintaining the shutters in synchronism while being rotated.

3. Cinematographic apparatus comprising a plurality of synchronous shutters, means for rotating the shutters which releases the shutters for continued rotation by inertia after the rotating means stops, and means for maintaining the shutters in synchronism at all times, both while being rotated and also while freely rotating by inertia.

4. Cinematographic apparatus comprising a plurality of intermeshing sectoral shutters, means for driving the shutters in synchronism, and over-running clutch means releasing the shutters for continued rotation when the driving means stops abruptly while maintaining the shutters in synchronism.

5. Cinematographic apparatus comprising a plurality of intermeshing sectoral shutters, means for rotating the shutters which releases the shutters for continued rotation by inertia after the rotating means stops, and means for maintaining the shutters in synchronism while being rotated.

6. Cinematographic apparatus comprising a plurality of intermeshing sectoral shutters, means for rotating the shutters which releases the shutters for continued rotation by inertia after the rotating means stops, and means for maintaining the shutters in synchronism at all times, both while being rotated and also while freely rotating by inertia.

7. Cinematographic apparatus comprising a shutter means for driving the shutter, and over-running clutch means releasing the shutter for continued rotation when the driving means stops abruptly while always maintaining the same angular relationships between the shutter and driving means while the shutter is being driven.

8. Cinematographic apparatus comprising a plurality of shutters controlling different optical paths, driving means for rotating the shutters, over-running clutch means releasing the shutters for continued rotation when the driving means stops abruptly, and means for maintaining the shutters in synchronism with each other, both while being rotated and also while freely rotating by inertia.

JOSEPH A. BALL.